Figure 2:
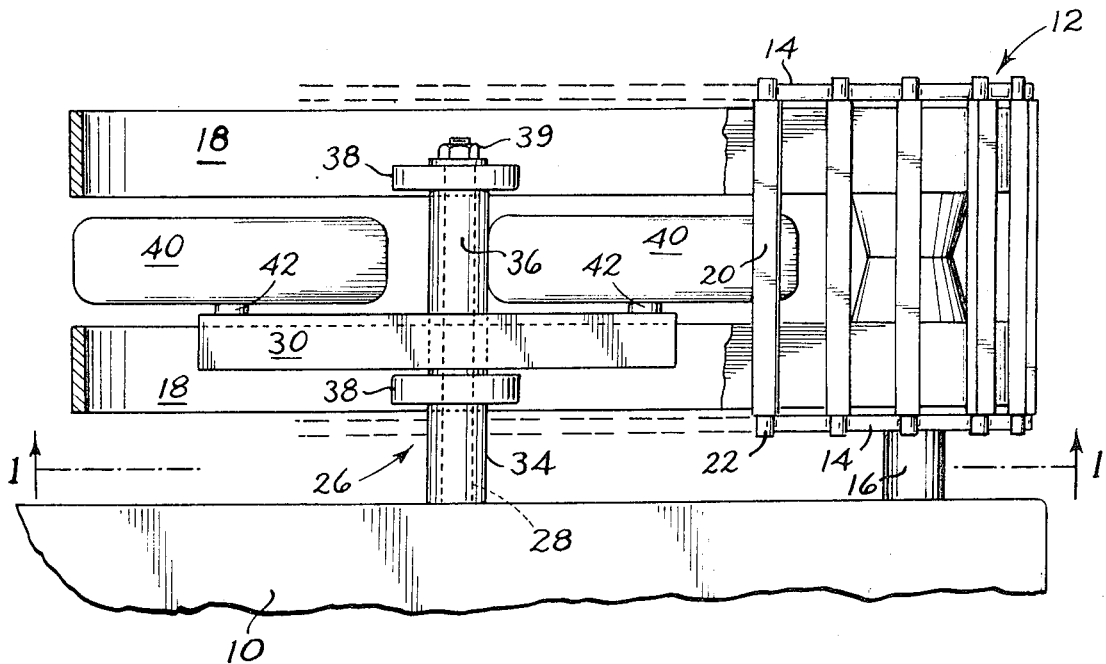

United States Patent [19]

Schoonover

[11] 3,717,214
[45] Feb. 20, 1973

[54] TRACKED VEHICLE WALKING BEAM ASSEMBLY WITH EQUALIZING MEANS FOR GROUND PRESSURE AND TRACK LENGTH

[75] Inventor: Richard H. A. Schoonover, West Linn, Oreg.

[73] Assignee: Formac International Inc., Seattle, Wash.

[22] Filed: July 31, 1970

[21] Appl. No.: 60,057

[52] U.S. Cl. ..................180/9.5, 180/9.62, 305/29
[51] Int. Cl. ..............................................B62d 55/08
[58] Field of Search .......180/9.5, 9.64, 9.62; 305/29, 305/30, 31, 32, 22, 23

[56] References Cited

UNITED STATES PATENTS

| | | | |
|---|---|---|---|
| 2,423,544 | 7/1947 | Acton | 305/29 |
| 3,375,944 | 4/1968 | Bexton | 305/29 |
| 3,550,967 | 12/1970 | Caron | 305/27 |

*Primary Examiner*—Richard J. Johnson
*Attorney*—Orland M. Christensen, David L. Garrison, Bruce E. O'Connor, Ron D. Havelka, Lee E. Johnson, Christopher O. Duffy, and Clark A. Puntigam

[57] ABSTRACT

A sprocket-driven, endless track drive for tracked vehicles has a walking beam assembly provided with equalizing means for equalizing variations in ground pressure and track length. The assembly comprises a support shaft extending laterally from the vehicle centrally of the track. A walking beam is pivotally mounted on the shaft. Forward and rearward bogey wheels substantially aligned horizontally on a plane below the sprocket are rotatably mounted on the ends of the walking beam, rearwardly of the sprocket. The mounting means mounting the walking beam is positioned forwardly of the longitudinal center of the walking beam a distance predetermined to stiffen the forward wheel against vertical displacement as the track transverses an obstacle. It also is positioned below the plane of the walking beam a distance predetermined to move the rear wheel outwardly and inwardly with upward and downward movement of the forward wheel, respectively. In this manner compensation is afforded for ground pressure and track length variations during operation of the vehicle.

5 Claims, 2 Drawing Figures

PATENTED FEB 20 1973  3,717,214

Richard H. A. Schoonover
INVENTOR
BY Eugene Farley
Atty.

TRACKED VEHICLE WALKING BEAM ASSEMBLY WITH EQUALIZING MEANS FOR GROUND PRESSURE AND TRACK LENGTH

This invention relates to walking beam assemblies for sprocket-driven, endless track drives for tracked vehicles.

In one well known class of tracked vehicles, an endless, sprocket-driven track drive is supported on forward and rearward bogey wheels. The latter are mounted on a horizontally arranged walking beam which permits flexing of the track to accommodate obstacles traversed by the track. The sprocket drive is mounted forwardly of the bogey wheels and on a horizontal plane elevated above the plane of the latter.

In the manufacture, operation and maintenance of tracked vehicles of this class, the following problems are of special significance:

Operation of the sprocket induces in the track a tension which tends to pull the forward bogey wheel upwardly, thereby reducing the ground pressure which it exerts.

When the forward bogey wheel rises upon traversing an obstacle, the rearward bogey wheel lowers. The converse action occurs as the rearward bogey wheel traverses the obstacle. Because of the relative positions of the sprocket and wheels, oscillation of the latter between raised and lowered positions causes lengthening and shortening of the track. To correct for the resultant track instability, spring loaded tensioners conventionally are applied.

Track torque tends to transfer weight to the rear of the track when pulling, thereby further creating uneven ground pressures.

Ground traction produces drawbar pull. Since the point of drawbar pull is above the point of traction, the ground traction point tries to pivot around the drawbar point. This is a particularly serious problem in the case of articulated, four-tracked vehicles where the tracks are short.

As the portion of the track intermediate the wheels traverses the obstacle, it is elevated to an extent such that it may strike the walking beam assembly, damaging one or the other of these two components.

It is the general purpose of the present invention to provide a walking beam assembly for use in sprocket-driven, endless track drives for tracked vehicles, which assembly overcomes the foregoing problems and which in addition eliminates the necessity for the application of spring loaded tensioners, is of relatively simple and rugged construction, is easy to maintain, and is widely applicable to tracked vehicles of diverse classes and sizes.

Figure 1:
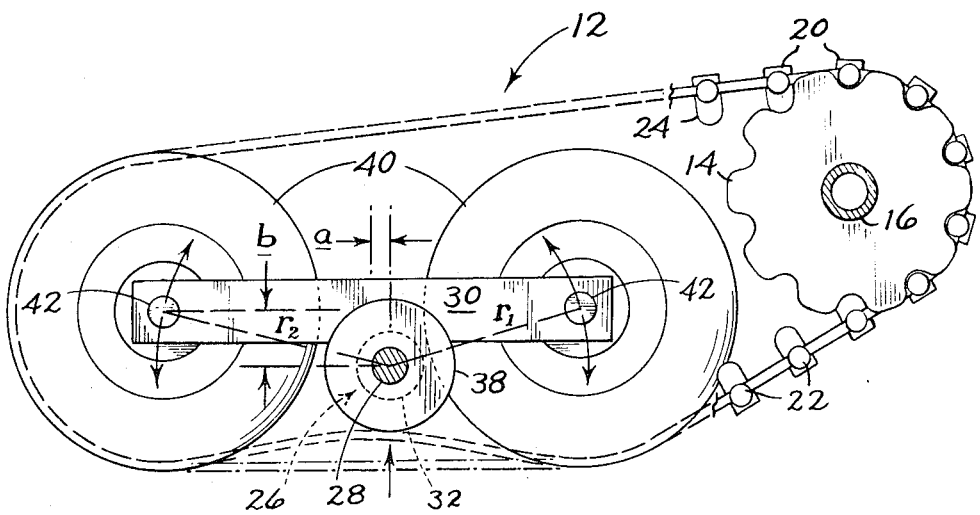

In the drawings:

FIG. 1 is a view in longitudinal section of the herein described walking beam assembly, taken along line 1—1 of FIG. 2; and FIG. 2 is a plan view of the assembly.

As noted above, the walking beam assembly of my invention is adapted for use on sprocket-driven, endless track drives for tracked vehicles. The assembly broadly includes a support shaft mounted on the vehicle and extending laterally, centrally of the track, a walking beam, and walking beam mounting means pivotally mounting the walking beam on the shaft longitudinally of the track and centrally thereof. Forward and rearward bogey wheels are rotatably mounted on the ends of the walking beam and bear against the inner surface of the track in track-supporting relation. These wheels are substantially aligned with each other horizontally on a plane below the plane of the sprocket and divide the track into an upper run which is shorter than the lower run.

The walking beam mounting means is located forwardly of the longitudinal center of the walking beam a distance predetermined to stiffen the forward wheel against vertical displacement. This compensates for track tension tending to pull the forward wheel upwardly and accordingly tends to equalize ground pressure of the vehicle.

The walking beam mounting means also is positioned downwardly from the walking beam a distance predetermined to cause the rear wheel to move rearwardly by pivotal motion of the walking beam as the front wheel is elevated selectively upon traversal of an obstacle, the converse movement being induced when the rear wheel selectively traverses the obstacle. This alteration of radius causes a corresponding lengthening and shortening of the track by an amount sufficient to equalize its length and impart stability to it.

In addition, back-up wheels are provided on the shaft for contacting the inner surface of the track whenever the latter is deflected upwardly in the region between the wheels by traversal of an object by the track.

Considering the foregoing in greater detail and with particular reference to the drawings, which depict an illustrative embodiment of the invention:

Vehicle 10 is driven by cooperating endless, belted track assemblies, one of which is indicated generally at 12. Each assembly is of the double belt type driven by a pair of laterally spaced sprockets 14 fixed to a drive shaft 16. The shaft extends laterally outwardly from the hull of the vehicle and is connected to the motor.

Endless track 12 includes a pair of endless belts 18 which are interconnected by a plurality of grousers 20. These comprise bar-type members which span the distance between the two belts and are bolted or otherwise secured thereto along the length of the track at spaced intervals.

The ends of the grousers are provided with longitudinally extending teeth, or lugs 22. These mesh with sprockets 14 of the drive.

Wheel guides 24 extend inwardly from the central part of grousers 20. They receive and guide the support wheels (bogey wheels) with which the assembly is provided.

The bogey wheels are mounted on a walking beam assembly which includes a composite support shaft indicated generally at 26.

This assembly includes a stout shaft 28 which is mounted on the vehicle body a spaced distance behind and below drive sprockets 14 and drive shaft 16. Shaft 28 extends centrally of track assembly 12, between the upper and lower runs thereof.

A walking beam 30 of heavy structural material is mounted on shaft 28 by being welded to a bushing or sleeve 32 which is journaled on the shaft and maintained in position by means of spacing sleeves 34, 36.

Also mounted on shaft 28 are backup idler rollers 38. These are positioned a spaced distance upwardly from the ground above belts 18, and serve to protect the walking beam mounting from damage caused by passage of the track over obstacles in the area between the bogey wheels.

Backup rollers 38 may be made of various materials. Preferably, however, they comprise discs of a strong, self-lubricating plastic such as polyurethane. Use of this material eliminates the necessity of providing bearings.

Bogey wheels 40 are journaled on shafts 42 which extend transversely from the ends of walking beam 30. The shafts are of sufficient length to position the wheels midway between belts 18 where they will contact and be guided by wheel guides 24 of the track assembly.

The location of shaft 28 which serves as the pivotal mounting means for the walking beam assembly is of great importance with respect to the operation of the entire track assembly.

As shown in FIG. 1, the shaft is located forwardly of the midpoint between axles 42 by a distance $a$. This in effect divides walking beam 30 into forward and rearward lever arms, the former being somewhat shorter than the latter.

Also, shaft 28 is located downwardly below the plane of the walking beam by the distance $b$ of FIG. 1. This creates two radii, a first radius $r_1$ between the axis of shaft 28 and that of forward axle 42, and a radius $r_2$ between the axis of shaft 28 and that of rearward axle 42. The former radius is somewhat shorter than the latter.

This arrangement effectively overcomes the problems noted above as being characteristic of the conventional tracked vehicles of the class under discussion.

Offsetting the pivotal mounting point of the walking beam assembly forwardly by distance $a$ compensates for the fact that the track tension pulls forward bogey wheel 40 upwardly and thus reduces its ground pressure. As noted, the forward arm of the drawbar is shorter than the rearward arm. This gives a mechanical advantage to the rearward arm which resists dropping of rear bogey wheel 40 and accordingly stiffens the walking beam against the pivotal motion required for elevation of front wheel 40. This in turn compensates for the tendency of track tension to pull the forward wheel upwardly.

Locating the pivotal mounting point of the walking beam 30, i.e., shaft 28, downwardly with respect to the longitudinal axis of the walking beam compensates for track length changes occuring when either the forward or rearward wheels travel up or down, as they do when crossing obstacles on uneven ground.

When the forward wheel crosses the obstacle, it rises while the rearward wheel goes down. This causes the length of the lower track run to shorten as the forward wheel crosses the obstacle and to lengthen as the rearward wheel crosses it. Locating shaft 28 downwardly by a predetermined amount compensates for this irregularity by reason of the fact that the rearward wheel shifts rearwardly when the forward wheel elevates and shifts forwardly when the forward wheel lowers. The resulting shifting of radius equalizes the track length under all conditions. It eliminates completely the necessity of employing the conventional spring loaded tensioner conventionally used for this purpose.

Locating the pivotal mounting of the walking beam forwardly and downwardly also compensates for track torque, which normally tends to transfer weight to the rear of the track when the assembly is under a pulling load.

It also minimizes the tendency of the ground traction point to pivot around the drawbar point, particularly where short tracks are employed.

Locating backup idler rolls 38 opposite belts 18 maintains the belts spaced from the walking beam assembly and prevents the track guides from being pushedinto the same when the track stretch between the bogey wheels is traversing the obstacle.

Still further, using a highly flexible track system employing a single bogey assembly in place of dual bogeys has important advantages. It allows for less complicated and less expensive running gear. It minimizes mud, snow and debris buildup between the bogeys with resultant shoving of the bogeys off the track guides. It permits one side of the track to lift when crossing an off-center obstacle, with resultant improved ride.

Using two side idlers prevents track twist and resultant track mis-alignment which, if sufficiently severe, can cause the track to come off the bogeys. Using two idlers also prevents excessive track twist when crossing an obstacle. The side rollers also prevent displacement of the track guides on the bogey side walls, and digging of the track edges into the ground in a turn, or on a steep side hill. When the track twist is severe, these factors otherwise might dislodge the track.

I claim:

1. An endless track drive for tracked vehicles comprising
   a. a walking beam support shaft mounted on the vehicle and extending laterally thereof,
   b. a walking beam,
   c. forward and rearward bogey wheel mounting shafts on the opposite ends of the walking beam,
   d. a bogey wheel on each mounting shaft,
   e. mounting means on the walking beam mounting the latter on the support shaft for pivotal movement about the axis of the support shaft,
   f. the mounting means being positioned on the walking beam with the pivot axis of the support shaft below a line extending through the axes of the wheel mounting shafts and forwardly of the midpoint between said axes of the wheel mounting shafts a distance predetermined to stiffen the forward wheel against upward displacement and to maintain substantially constant track tension during pivotal movement of the walking beam,
   g. a track drive sprocket mounted for rotation on said vehicle forward of said support shaft, the lower periphery of said sprocket being above the lower peripheries of said bogey wheels.

2. In a sprocket-driven endless track drive for tracked vehicles, a walking beam assembly comprising
   a. a walking beam support shaft mounted on the vehicle and extending laterally thereof,
   b. a walking beam,
   c. forward and rearward bogey wheel mounting shafts on the opposite ends of the walking beam,
   d. a bogey wheel on each mounting shaft,
   e. mounting means on the walking beam mounting the latter on the support shaft for pivotal movement about the axis of the support shaft, f. the mounting means being positioned on the walking beam with the pivot axis of the support shaft below a line extending through the axes of the wheel mounting shafts and forwardly of the midpoint between said axes of the wheel mounting shafts a distance predetermined to stiffen the forward wheel against upward displacement and to maintain substantially constant track tension during pivotal movement of the walking beam, g. an idler wheel journaled on the support shaft and dimensioned with its outer surface spaced upwardly from a line extending between the bottom surfaces of the bogey wheels, said idler wheel normally being spaced above the bottom stretch of track when the vehicle traverses substantially even terrain and engageable by said bottom stretch when the latter traverses a raised obstacle to prevent contact between the track and the support shaft.

3. The assembly of claim 2 wherein the track comprises a pair of laterally spaced endless track members, and a pair of idler wheels are journaled on the support shaft for cooperative association one with each track member.

4. In a sprocket-driven endless track drive for tracked vehicles, a walking beam assembly comprising a. a walking beam support shaft mounted on the vehicle and extending laterally thereof inside the track,
b. a walking beam,
c. forward and rearward bogey wheel mounting shafts on the opposite ends of the walking beam,
d. a bogey wheel on each mounting shaft,
e. mounting means on the walking beam mounting the latter on the support shaft for pivotal movement about the axis of the support shaft, and
f. an idler wheel journaled on the support shaft and dimensioned with its outer surface spaced upwardly from a line extending between the bottom surfaces of the bogey wheels, whereby the idler wheel normally is spaced above the bottom stretch of track when the vehicle traverses substantially even terrain, but is engageable by said bottom stretch when the latter traverses a raised obstacle, to prevent contact between the track and the support shaft.

5. The assembly of claim 4 wherein the track comprises a pair of laterally spaced endless track members, and a pair of idler wheels are journaled on the support shaft for cooperative association one with each track member.

* * * * *